United States Patent [19]

Arents

[11] Patent Number: 4,859,026
[45] Date of Patent: Aug. 22, 1989

[54] OPTICAL ASSEMBLY FOR AIRCRAFT TRAILING GROUND LINES

[75] Inventor: Donald N. Arents, Newport News, Va.

[73] Assignee: The United States of America as represented by the Secretary of the Army, Washington, D.C.

[21] Appl. No.: 157,006

[22] Filed: Feb. 18, 1988

Related U.S. Application Data

[63] Continuation of Ser. No. 585,689, Mar. 2, 1984, abandoned, which is a continuation of Ser. No. 312,219, Oct. 19, 1981, abandoned.

[51] Int. Cl.[4] .............................................. G02B 6/06
[52] U.S. Cl. ............................... 350/96.25; 350/96.10
[58] Field of Search ........................... 350/96.10, 96.25

[56] References Cited

U.S. PATENT DOCUMENTS 3,776,222  12/1973  Smiddy ................................ 128/6

Primary Examiner—William L. Sikes
Assistant Examiner—Robert E. Wise
Attorney, Agent, or Firm—Norman L. Wilson, Jr.

[57] ABSTRACT

In rescuing victims from such disasters as burning building with rescue lines or platforms, on in-flight refueling, and on hooking cargo hooks onto load rings, it is difficult to align the lines, platforms, hooks, or hoses, with the objects they are working with. It is a challenge for the pilot to maintain the proper position of his aircraft by means of voice directions and visual cues. Under normal visual conditions, the task is not easy. Under low visibility conditions the task can become very dangerous. A specialized optical assembly affording aircraft crewman the visibility for external coupling is provided herein. The invention enables the pilot to acquire an external load quickly and efficiently without ground assistance, even under instrument meterorological conditions.

6 Claims, 3 Drawing Sheets

OPTICAL ASSEMBLY FOR AIRCRAFT TRAILING GROUND LINES

CROSS REFERENCE

This application is a continuation of my application Ser. No. 585,689, filed Mar. 2, 1984, which was a continuation of my earlier application Ser. No. 312,219, filed Oct. 19, 1981, both of which are abandoned.

BACKGROUND OF THE INVENTION

This invention relates to the effective use of aircraft trailing ground lines. In one of its aspects the invention is concerned with visibility problems presented by the use of trailing ground lines. In another aspect the invention pertains to means overcoming aircraft trailing ground line utilization problems.

Aircraft trailing ground lines are those pendant arms used on helicopters, and some fixed wing aircraft, such as rescue lines, load hook lines, fuel lines, disaster platforms and the like used in refueling, rescue missions, cargo carrying and similar tasks.

In rescuing victims from such disasters as burning buildings with rescue lines or platforms, or in in-flight refueling, and on hooking cargo hooks onto load rings, it is difficult to align the lines, platforms, hooks, or hoses, herein referred to as trailing ground lines, with the objects the trailing ground lines are working with, such as fuel tanks, load rings, and windows, because the trailing ground lines are hanging from the aircraft bottom and cannot be seen by the aircraft crewmen. Current equipment and methods for using trailing ground lines have evolved from the need to meet demands as they arose. These presently used procedures are hazardous and difficult to carry out. Generally, a person beneath the hovering helicopter or in another aircraft must signal the pilot. Frequently it became a matter of the helicopter pilot swinging the lines to the person below. Usually that person then must manually connect or hold the ground line in place. It is a challenge for the pilot to maintain the proper position of his aircraft by means of voice directions and visual cues. Under normal visual conditions, the task is not easy. Under low visibility conditions the task can become very dangerous, and seriously compromise mission effectiveness. Moreover, the use of these methods under instrument meteorological conditions is beyond the capability of the current inventory aircraft with procedures now in use.

A number of studies have been made to determine various conceptual approaches to load acquisition problems. With some measure of success visual augmentation systems have been attempted, for example, closed circuit television apparatus. However, such systems are expensive and present depth perception problems. This invention provides a full field of view for a pilot or other crewman remotely situated from the working end of the trailing ground line, and also an enlarged field of view focusing on the object the line is coupling with. The coupling, whether a platform adjacent a window, a hose in a fuel tank or a hook in a load ring, can be accomplished without help from below. More important coupling is possible under instrument flying conditions where television viewing is not feasible.

SUMMARY OF THE INVENTION

This invention provides an optical assembly for use with an aircraft trailing ground line enabling an aircraft crewman without ground assistance to judge distances from the trailing ground line working end to objects with which the trailing ground line is working. A fiber optic magnifying view capable of displaying fiber optically transmitted images, is adapted for mounting with other aircraft instruments. A fiber optic image reception lens unit adapted to produce a portion of an image with high magnification and a portion of an image with low magnification is adapted for mounting on the working end of the trailing ground line. A flexible fiber optic coherent light guide capable of transmitting light of ultraviolet through infrared wavelengths is interposed between the magnifying viewer and the image reception lens unit, transmitting images from the lens unit on the trailing ground line working end to the magnifying viewer. The high magnification provides the crewman an enlarged forward field of view enabling him to judge the position of the trailing ground line and the low magnification provides the crewman with a wide angle view enabling him to judge the approach of the trailing ground line to the object. The remote view enables him to guide the line (and aircraft) directly into position.

It is a specific object of the invention to provide a device which enables a helicopter pilot to acquire an external cargo load without ground assistance, even under weather conditions requiring instrument flying.

DETAILED DESCRIPTION OF THE INVENTION

In 3,776,222, a fiber optic bronchoscope is suggested for use, instead of a laryngoscope, for improved visibility during endotracheal intubation, particularly nasal intubation. This use of a surgical instrument and my helicopter ground line problem are nonanalogous. The various differences will be come more apparent from the following description of this invention with reference to the accompanying drawings wherein.

Figure 3:
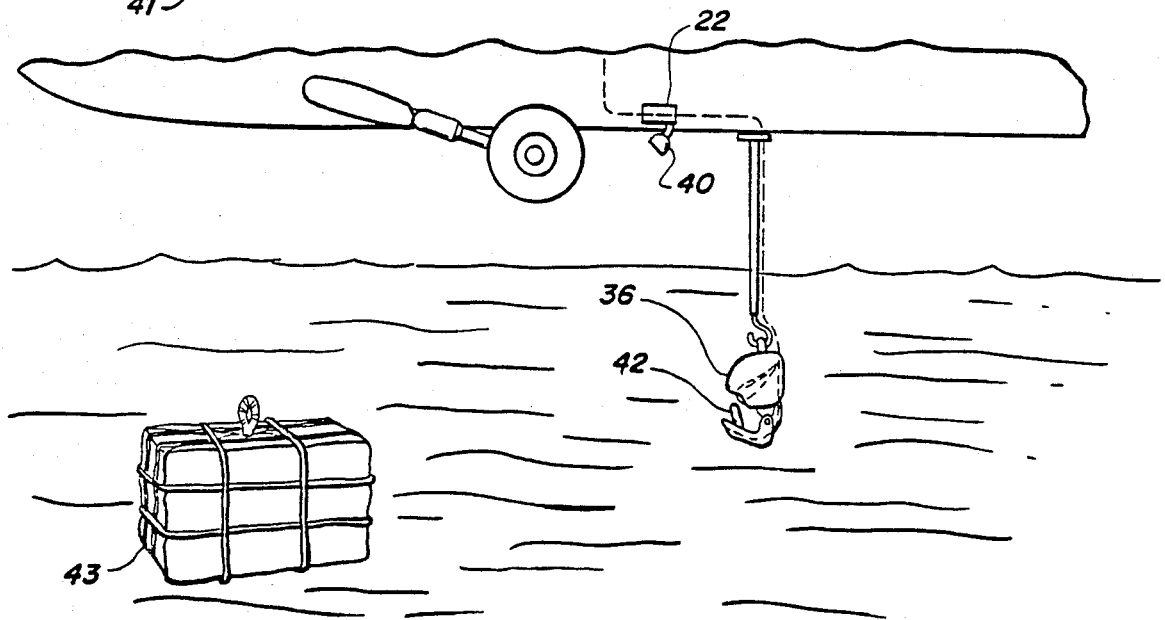

FIG. 3 illustratively shows a load hook, and its approach to a cargo load ring.

Figure 4:
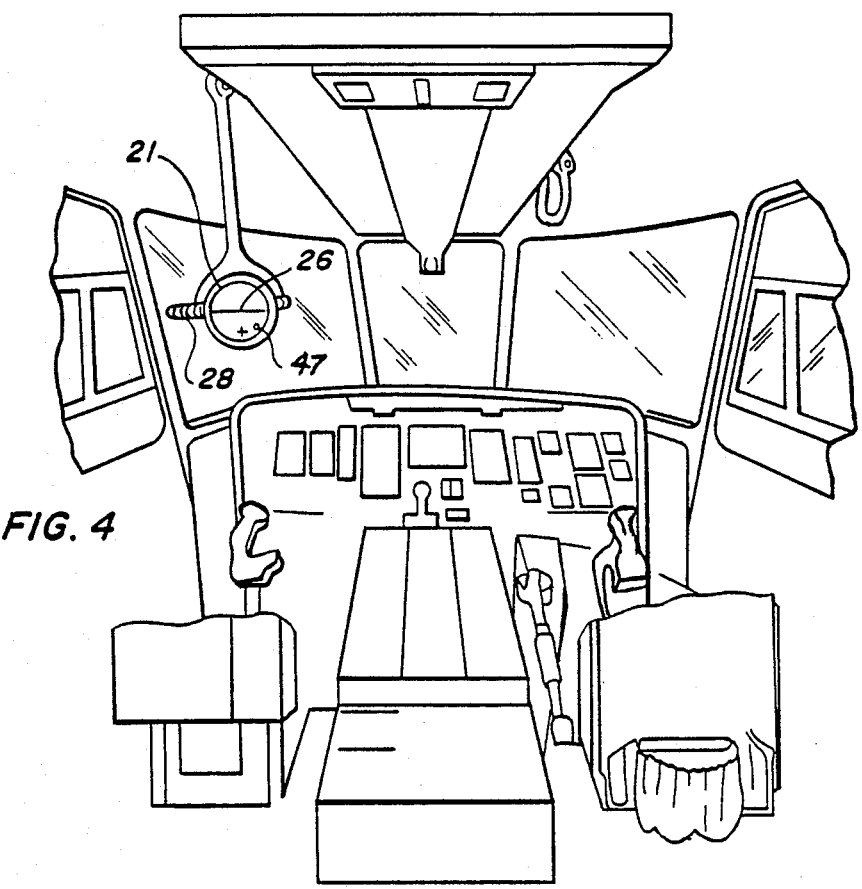

FIG. 4 illustrates a bioptic fiber optic load acquisition device viewer installed in the co-pilot position in a helicopter.

Figure 5:
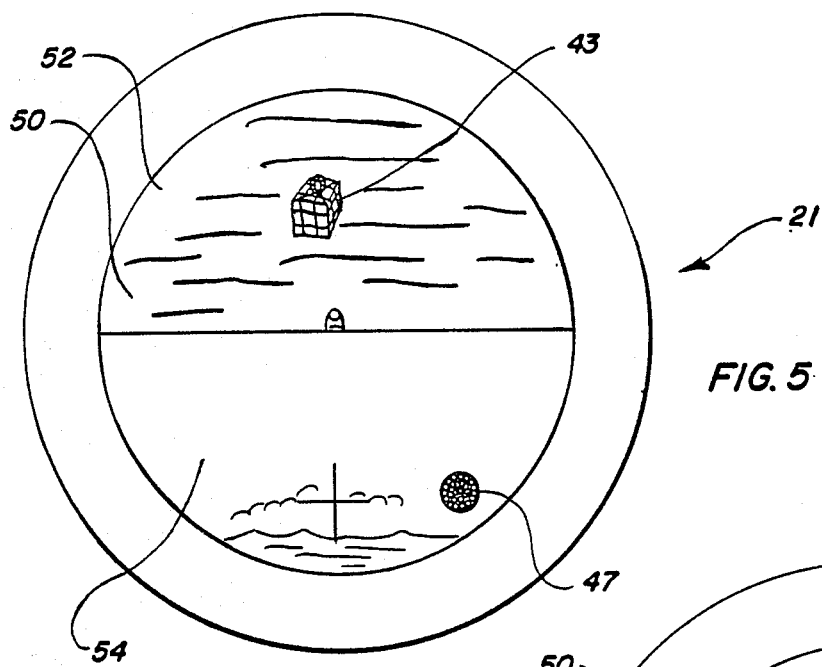
Figure 6:
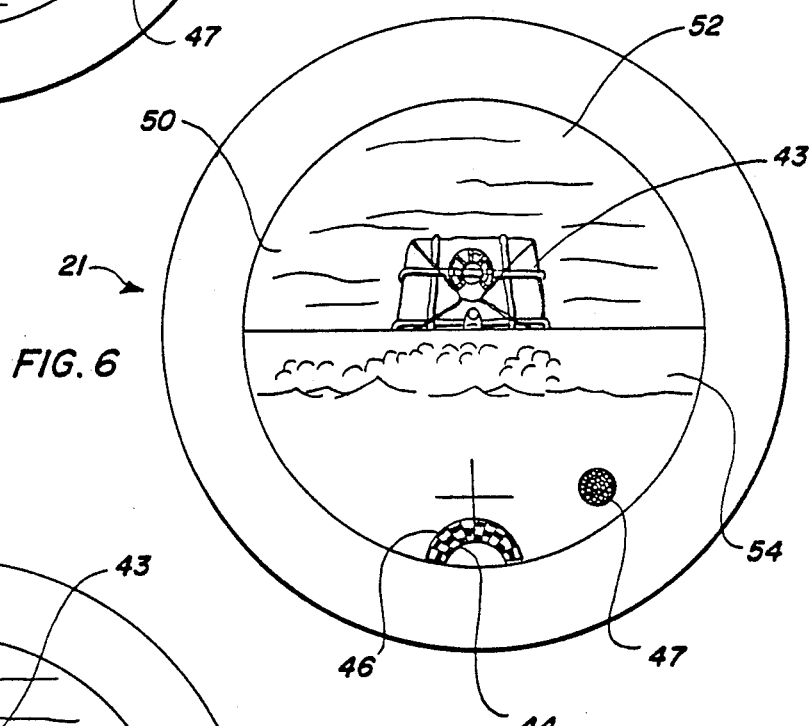
Figure 7:
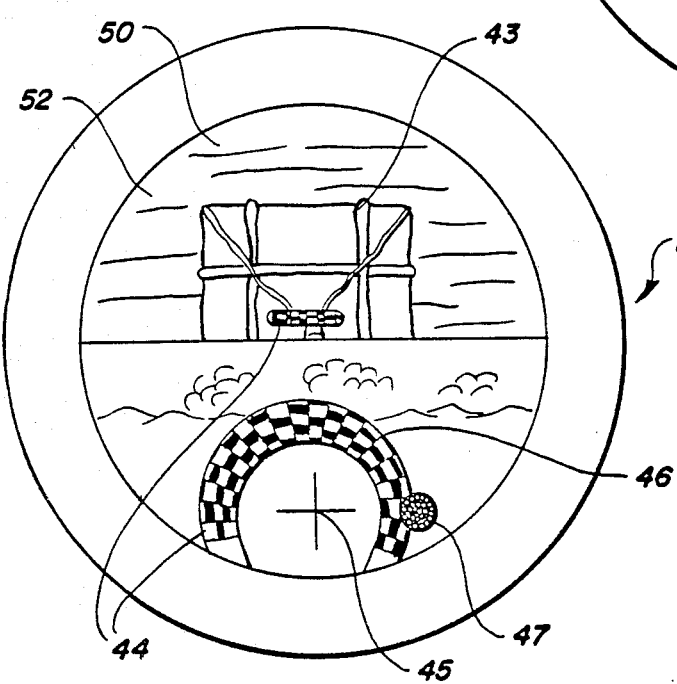

FIGS. 5, 6, and 7 illustrate images on the bioptic viewer which will be seen by the crewmen as the aircraft approaches and acquires a load.

Figure 8:
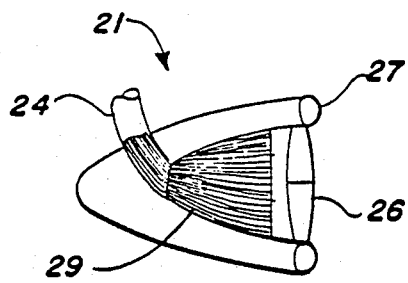

FIG. 8 is a side view partially in section, of the bioptic viewer.

Figure 9:
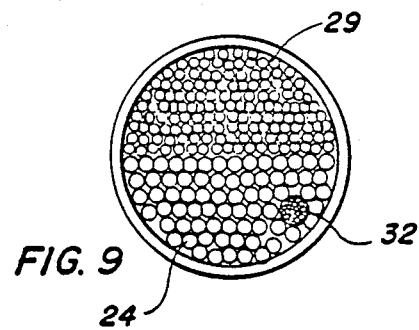

FIG. 9 is a front view partially in section, of the bioptic viewer.

Figure 10:
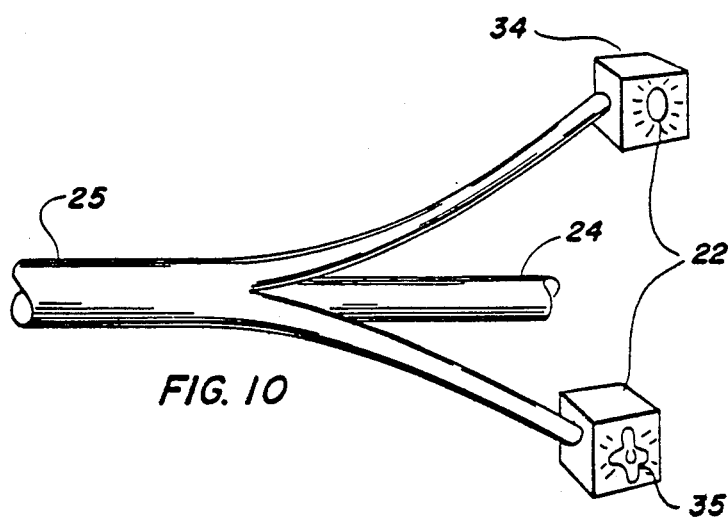

FIG. 10 is a diagrammatic view of a cargo load illumination device.

Figure 11:
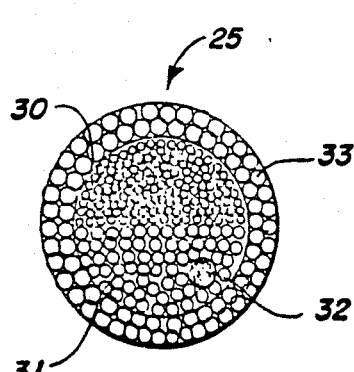

FIG. 11 is a cross-sectional view of the preferred fiber optic cable.

With the understanding that it can be a rescue platform, or a fuel or other line the invention will now be described in its preferred form, that of a load line and cargo hook.

Figure 1:
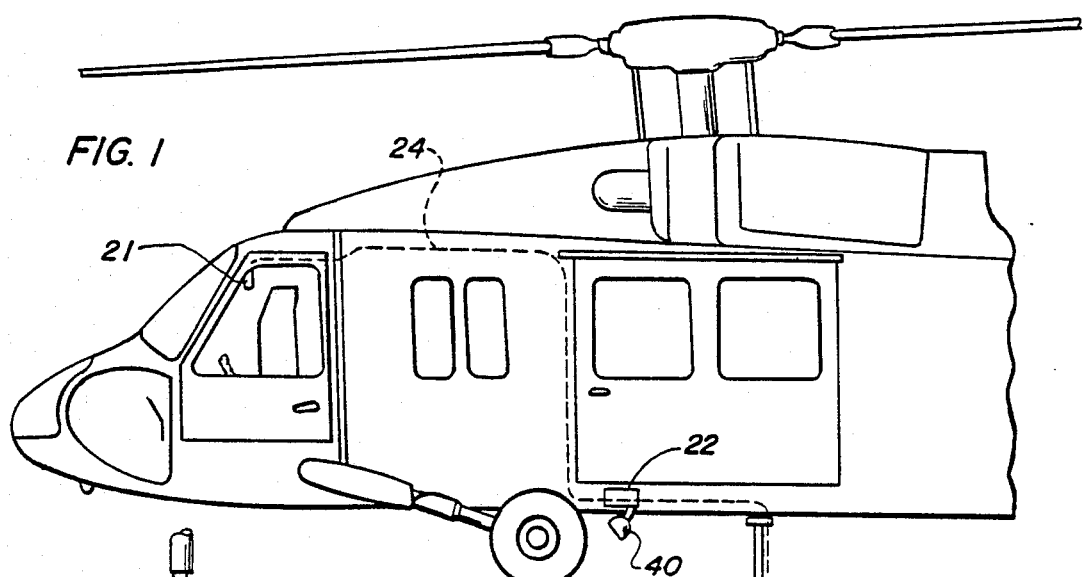
FIG. 1 is a pictorial illustration of the optical assembly of the present invention as installed in a helicopter.

Referring first to FIG. 1, the entire optical assembly of the present invention is shown. The optical assembly includes a viewer 21, an illumination source 40, powered by a generator 22, an objective lens assembly 23, and a fiber optic cable 24. The figure illustrates the assembly as installed in a helicopter.

In a preferred form, the viewer 21 as shown in FIGS. 4 thru 7 is a biocular viewer having a cushioning pad 27, a handle 28, and a fiber optic conical magnifier coherent bundle 29. (FIGS. 8 and 9). The narrow end of the conical bundle 29 receives images from the fiber optic bundle cable 24 and enlarges them at the viewer lens 26. Objective lens assembly 23 carries two lenses. Lens 39 is a wide angle lens, and lens 41 is a close-up lens. The cable 24 contains a coherent bundle to carry images from these two lens assemblies to a magnifying viewer such as 26. Cable 24 includes an incoherent bundle 32 (cross sectional view 11), which serves as a light guide from the hook keeper 42 to the indicator portion 47 in the biocular viewer 21.

As can be concluded from the usage of the bronchoscope of 3,776,222, coherent and noncoherent fiber optic bundles are so well known they need not be discussed at length herein. Such optical fibers are readily available as light pipes or image guides from Corning Glass and American Optical. Likewise relay lenses, conical magnifiers, objective lenses, and biocular lenses, or bioptic viewers are on the market, and are well known by those skilled in the art.

Figure 2:
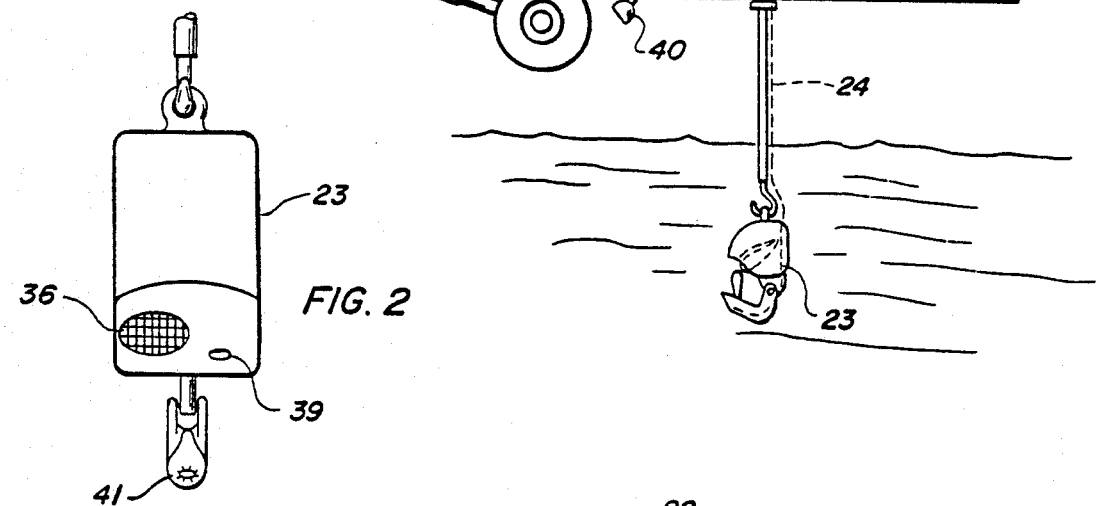
FIG. 2 is a front view of a lens unit.

FIG. 10 illustrates a light generator source 22. The light source comprises a visible light source 34 and a nonvisible spectrum light source 35 which provide light to light guide fiber optic bundle 33 which combines with fiber optic bundle 24 to form fiber optic bundle 25. Selection of either the visible or nonvisible illumination is made by a switch assembly (not shown). Visible light can also be supplied by a floodlight 40 on the helicopter body. The nonvisible light can be ultraviolet or infrared, actuated by a covert switch, and projected through lens 36 (FIG. 2). A source of power is supplied from the aircraft electrical system (also not shown).

In a preferred embodient of the invention two lenses 39 and 41 as shown in FIG. 2 are used, along with a biocular viewer face 50 to provide a wide angle view 52 and an enlarged forward field of view 54, transmitted by coherent bundle 24 to biocular viewer face 50. Specifically the image, through close-up lens 41, is carried by coherent light transmitting fiber optic bundle 31 coupled to the lens. The coherent light transmitting fiber optic bundle transmits the image to the lower portion 54 of biocular viewer face 50. The broader view is transmitted through wide angle lens 39, connected to coherent light transmitting fiber optic bundle 30 which transmits the image to the upper portion 52 of biocular viewer face 50. Optical fiber couplings, adapters and connectors came into being with light pipes. They are just as well known, and they are commercially available. The illumination projection lens 36 supplies the light transmitted by incoherent light transmitting fiber optic bundle 33. In a specific embodiment hook snap or keeper 42 can be provided with a pad to block the end of light pipe 32. When the hook keeper opens as the load is acquired, the end of incoherent light transmitting fiber optic bundle 32 is exposed, permitting light to be transmitted to lower circle 47 of biocular viewer face 50.

Having described the structure of the invention, its operation will now be discussed in a specific application, that of external load acquisition. Referring specifically to FIGS. 5, 6, and 7, after the aircraft reaches the general location of the cargo pickup site the crewman begins observing the target load 43 on the upper portion 52 of the bioptic viewer face 50. He will see the image being received by the objective wide angle lens 39 as illustrated in FIG. 5. The upper half of the bioptic viewer face 50 is linked by the fiber optic bundle 30 to the wide angle lens 39 for this purpose.

As the aircraft approaches to acquire load 43 the crewman shifts his view to the lower portion 54 of bioptic viewer face 50 illustrated in FIG. 6. The load ring 44 can be viewed in this frame 54 through the close-up 41 as the hook approaches its attaching position. Fiber optic bundle 31 transmits the image to frame 54. The load ring 44 is accentuated with expendable reflective tape 46.

As illustrated in FIG. 7, when the hook keeper 42 (FIG. 3) contacts load ring 44 the fiber optic bundle 32 will receive a ray of light. That light will be transmitted through fiber optic bundle 32 to the indicator 47, whose light will indicate that keeper 42 is approaching load ring 44. Existing light indicates that the keeper is open, the light being daylight, or rays from source 22 suppling light for night or covert mode operation. Reflective tape 46 is alternatingly used to provide portions reflective to visible and nonvisible spectrum light.

It can be seen that the invention herein affords a view of trailing ground lines from the cockpit. It enables the cockpit crew to hookup to loads or other objects without help from a ground crew, even under low visibility conditions. The apparatus of the invention can be swung down and operated by the copilot. As the aircraft descends and approaches the load or another aircraft and hovers near that object, the reflective tape will become visible. When the aircraft closely approaches the load or the other aircraft the crewman shifts his view to the lower portion of the viewer. In daylight no other lighting is required. At night, unlike bright light required by television monitors, sufficient illumination can be provided from a light source in the aircraft.

This invention thus provides a direct view without any active components except illumination under dark or covert conditions. The invention is subject to wide use since it can be used on virtually any trailing ground line whatever its use. In addition, it can be used on virtually any helicopter, independently of helicopter size. The cost and weight penalty are minimal in relation to alternatives, and the invention permits the object with which it is working to be identified and coupled more rapidly than known methods. It will be appreciated also that variations and modifications can be made, adding even more uses of the invention. Thus, to provide the light for night operations a conventional searchlight 40 can be mounted underneath the aircraft. Further, with multiple fiber optic cables, variations in rescue platforms and multihook systems can be employed. Such ramifications are, of course, well within the scope of this invention.

What is claimed is:

1. In an aircraft having a trailing ground line suspended therefrom for use in rescue missions, refueling and cargo handling, wherein, since a pilot cannot see the trailing ground line beneath the aircraft to align its working end with rescue platforms, windows, fuel tanks and cargo load rings, a person at the site must signal the pilot, the combination of the trailing line with an optical assembly enabling the pilot to see the precise location of the working end, the optical assembly including a fiber optic image reception lens unit, said lens unit being adapted to produce a portion of an image which is magnified and a portion of an image which is visible in a wide field of view, means for mounting the lens unit on the working end of the trailing ground line, a fiber optic magnifying viewer capable of displaying fiber optically transmitted images, means for mounting the viewer in the aircraft with other aircraft instruments, a flexible fiber optic light guide capable of transmitting coherent light of ultraviolet through infrared wavelengths, and adapted to be interposed between the image reception lens unit and the magnifying viewer, adapter means fiber optically connecting one end of the light guide to the magnifying viewer, the adapter means fiber optically connecting the other end of the light guide to the lens unit so that the light guide transmits images from the lens until on the trailing ground wire working end to the magnifying viewer in the aircraft, and so that the lens unit provides the pilot an enlarged forward field of view enabling him to judge the position of the trailing ground line, and a wide field of view enabling him to judge the approach of the trailing ground line to the object.

2. The combination of claim 1 wherein the fiber optic image reception unit of the optical assembly includes a magnifying lens mounted near the tip of the trailing ground line to focus on the object, a wide field of view lens mounted away from the tip of the trailing ground line to afford visibility during the approach to the object, and wherein the magnifying viewer is a biocular viewer enlarging the output of the magnifying lens on one portion of its screen and the output of the wide field of view lens on a different portion of its screen.

3. The combination of claim 2 wherein the optical assembly includes indicator means transmitting a signal to the biocular viewer when the trailing ground line contacts the object.

4. The combination of claim 2 wherein the optical assembly includes means supplying illumination when required by visibility conditions.

5. The combination of claim 4 wherein the illuminating means supplies nonvisible illumination in the infrared range.

6. The combination of claim 4 wherein the illumination means supplies nonvisible illumination in the ultraviolet range.

* * * * *